Figure 1:
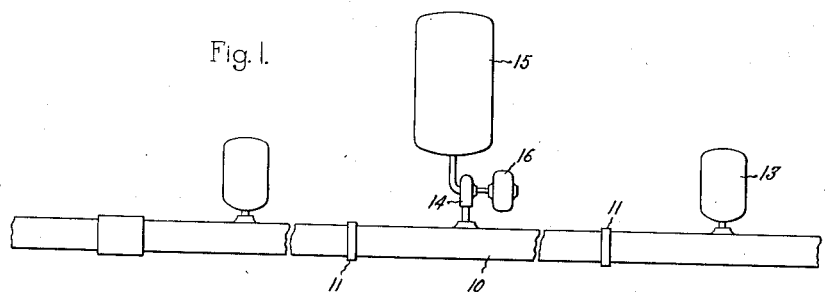

Feb. 12, 1935.  G. B. SHANKLIN  1,991,230
ELECTRIC CABLE SYSTEM AND METHOD OF INSTALLING THE SAME
Filed July 26, 1933   2 Sheets-Sheet 1

Inventor:
George B. Shanklin,
by Harry E. Dunham
His Attorney.

Feb. 12, 1935.　　　G. B. SHANKLIN　　　1,991,230
ELECTRIC CABLE SYSTEM AND METHOD OF INSTALLING THE SAME
Filed July 26, 1933　　　2 Sheets-Sheet 2

Inventor:
George B. Shanklin,
by　Harry E. Dunham
His Attorney

Patented Feb. 12, 1935

1,991,230

UNITED STATES PATENT OFFICE 1,991,230

ELECTRIC CABLE SYSTEM AND METHOD OF INSTALLING THE SAME

George B. Shanklin, Schenectady, N. Y., assignor to General Electric Company, a corporation of New York Application July 26, 1933, Serial No. 682,225

9 Claims. (Cl. 247—3)

The present invention relates to cable systems for transmitting electric energy, especially underground.

It has long been recognized that the insulating value of fibrous material can be increased by subjecting it to pressure, and that said value increases with increase of pressure. For some kinds of electrical apparatus, no particular trouble is experienced in maintaining the desired pressure while for other types of apparatus, as cable for example, such is not the case because of the lack of strength of the lead sheath.

There is a type of cable comprising three conductors which are individually insulated with paper, the latter being impregnated with a relatively thin oil. The insulated conductors are enclosed in a lead sheath which is made of substantially triangular form as distinguished from the usual cylindrical form, so as to permit the sides to move outwardly and inwardly with changes in volume of the contained insulating fluid due to changes of temperature. In such a cable the expansion of the oil when the cable is in service would cause the sheath to be stretched to a dangerous extent unless means to prevent it were provided. In the case mentioned, undue stretching is avoided by the following means: The cable is drawn into a steel pipe and the pipe is then filled with nitrogen under relatively high pressure which acts on the outside of the sheath. The theory of operation is that the lead sheath, which is sealed against the fluid within the pipe, will due to its shape move outwardly in a generally radial direction as the impregnating oil heats, and will be moved inwardly by the nitrogen in the pipe acting on the outer surface of the sheath as the oil cools and its volume is reduced. Such a system has certain advantages, but it has one outstanding defect in that the movements of the lead in and out cause fatigue of the metal which ultimately will result in failure. In this connection, it is to be borne in mind that the life of a modern cable should be of the order of twenty-five or thirty years.

As stated by Dunsheath and Tunstall in their paper entitled "The physical properties of lead sheaths" and printed in the Journal of the Institution of Electrical Engineers, Vol. 11, December, 1927–November, 1928, page 283, "It is widely appreciated that lead fails rapidly on repeated distortions."

In my improved cable or cable system, I avoid the defect above mentioned and maintain dry inert gas such as $CO_2$ under suitably high pressure on the inside as well as on the outside of the sheath or covering and at the same time permit a free exchange of movement of the gas between opposite surfaces of the sheath or covering. In other words, the sheath is no longer subjected to a difference of pressure on its two sides and hence does not move in response to changes of temperature of the impregnating compound. I may use a viscous impregnating compound for the insulation which flows rather freely with temperature changes of the cable, or I may use a compound which is substantially unaffected by the normal temperature changes of the cable, or one which is so little affected that its movements can be disregarded. From another point of view, the sheath or covering instead of being used as a complete separator for the impregnating compound, whatever be its nature, and gas within the pipe serves merely as a mechanical protector for the cable during its manufacture and subsequent handling. Because the same gas is utilized both within as well as outside of the covering special arrangements are provided to ensure free and complete movements of the gas between the inside of the cable proper and its enclosing rigid pipe line. Because of the equalization of pressures as above mentioned, there is no tendency for the lead sheath to collapse or wrinkle as would be the case if the sheath acted as a complete separator, and it so happened that the insulation within it, particularly in the filler spaces, was less dense in one region than in another.

For a consideration of what I believe to be novel and my invention, attention is directed to the accompanying description and the claims appended thereto.

Figure 2:
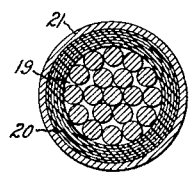
Figure 3:
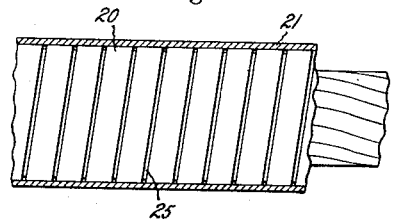
Figure 4:
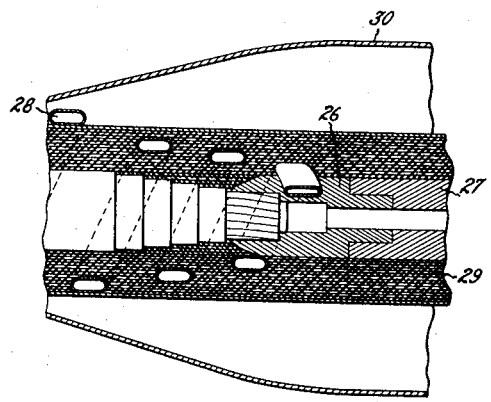
Figure 5:
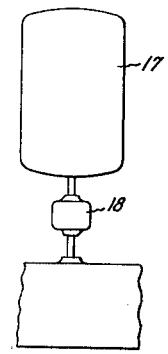
Figure 6:
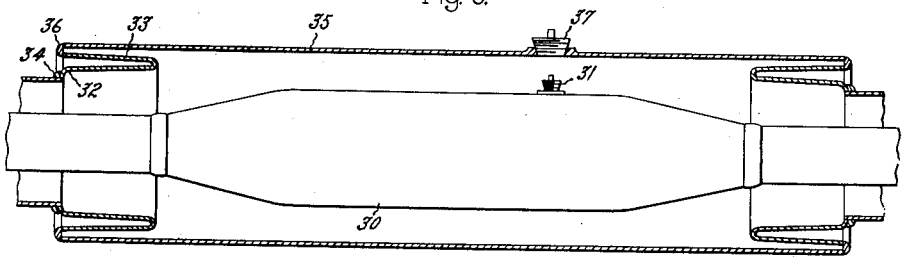
Figure 7:
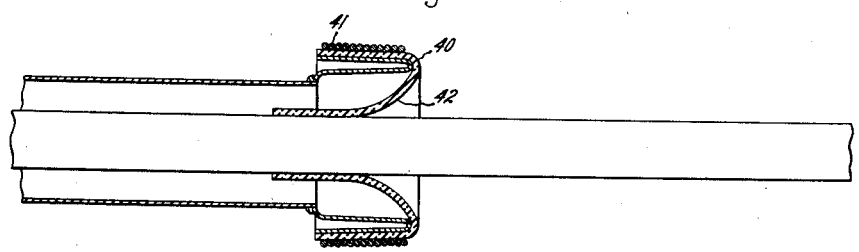
Figure 8:
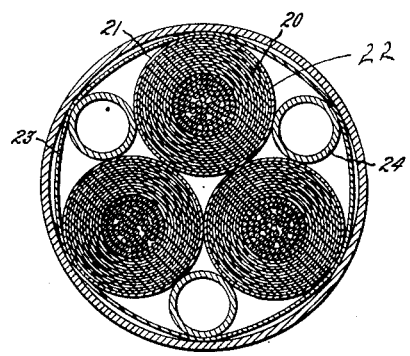

In the accompanying drawings, which are illustrative of my invention, Fig. 1 is a diagrammatic illustration of a cable system; Fig. 2 is a cross section of a length of single core cable; Fig. 3 is a side view of a piece of cable with the sheath broken away; Fig. 4 is a sectional view of a joint; Fig. 5 is a detail view showing a means for charging the pipe line containing the cable with gas under relatively high pressure; Fig. 6 is a sectional view of one of the pipe joints; Fig. 7 is a sectional view showing a rubber dam for temporarily closing an end of the pipe system during evacuation thereof and while the cable is being drawn into place, and Fig. 8 is a cross section of a multi-core cable.

In Fig. 1, 10 indicates lengths of steel or other non-yielding pipes which are of sufficiently large diameter to freely receive the cable and in addition to form a longitudinal gas containing chamber. The lengths are united to form sections by means of electric welds or other joints 11 which are capable of withstanding the high pressure gas with which the pipe is charged when the cable is in use without leakage. The pipe line is designed to be laid on open trenches and afterwards covered by earth. This permits of electrically welding or otherwise uniting many pipe lengths above the level of the road and subsequently lowering the sections so formed to their final positions and before the cable is pulled into place. As an alternative the pipe lengths may be welded or united in the trench. Either procedure is satisfactory and the one used will be determined chiefly by local conditions. Fig. 6 indicates one of the joints between pipe sections as distinguished from the joints between pipe lengths. The arrangement described has the advantage of doing away with expensive conduits such as are employed in cable installations in city streets, and is particularly applicable for use in districts outside of congested areas and where trenching is permissible. Where conduits are installed, however, short pieces of pipe may be pulled into them, length by length, each length being united to the one in advance before entering the conduit. This is, of course, also dependent upon having sufficiently large manholes to permit of handling the pipe. Before or after uniting the pipe lengths, each should be carefully cleaned to remove foreign matter as completely as possible. Later, after welding the lengths and before the cable is drawn into place, each pipe section, meaning thereby a number of united pipe lengths, should be heated to remove moisture, as for example by blowing a current of hot air through it, after which the air is removed by evacuation and the pipe filled with a neutral gas, such as $CO_2$, under low positive pressure. The low positive pressure of two or three pounds is maintained during field assembly to prevent entrance of air.

After assembly I maintain a supply of $CO_2$ or other inert gas within the pipe line, and also within the cable itself and maintain it at a suitably high pressure, say of the order of 100 to 300 lbs. per square inch. The gas should be treated before use to remove as fully as practicable all moisture contained therein. The use of gas as a medium for transmitting high pressure has the advantage over liquid, such as oil, in that it does away with the necessity of large and expensive stop joints to break up the hydrostatic head of oil such as is caused by the rugged profile of the ground covered by the cable. However it is desirable to segregate the sections so that in the event of injury to one section resulting in the loss of gas pressure, the other sections will be unaffected. After the pipe line is completely installed with the cable therein and all joints properly made, gas under pressure is admitted to the pipe until the predetermined operating pressure is obtained. This pressure may be maintained within specified limits by means of gas containing domes 13 located at suitable intervals along the line and, if necessary, one or more automatic pumps 14 which receive their supplies of gas from large reservoirs or tanks 15 located within suitable protective enclosures. The particular construction of the pump is immaterial as is also the driving motor 16 and the controlling mechanism which controls the motor and the delivery of gas by the pump into the pipe line. By using a relatively high gas pressure, moderate changes of gas pressure will not interfere with the successful operation of the cable system. Instead of using pumps, I may use vessels 17, Fig. 5, containing bodies of gas under much higher pressure than is required and interpose between each vessel and the pipe line an automatic reducing valve 18 set to maintain the desired lower pressure in the pipe line. For some installations, both automatic pumps and vessels will be found desirable. The pumps or vessels should be so spaced as to avoid serious pressure drop along the pipe line and the gas channels of the cable.

The cable itself may be single or multiple conductor and may be made in a variety of ways. In any event, a suitable enclosing lead sheath is provided. I utilize the strand spaces, meaning thereby the small spaces 19 between strands of which the conductor is composed, as channels for the high pressure gas to which the insulation on the conductor is subjected. The strands may follow the usual concentric arrangement about a central strand or core. Where such a construction does not provide a gas carrying channel of sufficient cross sectional area without undue pressure drop, I may omit one or more strands in the conductor and thus obtain the effect of an enlarged channel. As an alternative, the conductors may be stranded in such a way as to provide a hollow core with suitable channels between strands. I may also provide a small radial space between the periphery of the insulation on the conductor and the enclosing lead sheath by inserting a spacing member between the insulation and the sheath. In other words, with respect to the formation of gas channels, I may use any of the well known types of cable construction in carrying out my invention. The conductor is covered with factory applied insulation 20 around which is a thin lead sheath 21.

In Fig. 8 is shown a multi-core cable in which each core is made in the manner described in connection with Figs. 2 and 3. In addition, the insulation on each core has an electrostatic shield 22 and the cores are bound together to prevent spreading by a steel or other binding band 23. Outside of the band is a lead sheath. Inside of the sheath and in the spaces commonly occupied by fillers of insulation there may be located flexible metal tubes or equivalent means 24 which serve as mechanical supports for the sheath. As an alternative both the tubes and fillers may be omitted in which case the sheath will assume a substantially triangular shape.

The paper insulation 20 on the conductor may be treated in various ways. It may be impregnated with the same compound that is commonly used in the manufacture of so-called solid cable. Such a compound is rather viscous and has a tendency to become thinner when heated to cable-operating temperature. Because of the presence of high pressure gas in the channels or strand spaces in the conductor or in the hollow core thereof or both, any compound which would otherwise tend to enter them is prevented and the gas will force the compound outwardly toward the inner wall of the sheath.

The conductor instead of being insulated with paper which is impregnated after being wound in place may be insulated with pre-treated paper tape, as for example, by thoroughly impregnating the paper with varnish. Such tapes are illustrated in Fig. 3. The varnish or other impregnating material or compound when once dried should be sufficiently heavy so as not to run or liquefy at maximum operating temperature since otherwise it might fill or tend to fill some of the gas channels and thus prevent the free movements of the gas. The tape should be so applied that between the adjacent edges of each two turns a small spiral space or channel 25 is left so that gas under pressure from the strand spaces or central channel can pass therethrough with a reasonable degree of freedom from the center to the periphery. These channels are relatively long due to the fact that they encircle the conductor many times, and because of that fact and because of the high gas pressure to which they are subjected from the gas chamber of the pipe line, there will be no leakage of current through them from the conductor outwardly. The paper tape is applied layer by layer and the tape of one layer is arranged to break joint with the adjacent layer both inside and outside. The chief thing to be considered is the provision within the cable of small but ample spaces or channels for the gas so that it can move in a generally radial direction from the center of the cable to the periphery as the cable heats in service and inward toward the center as the cable cools. In other words, all of the space or spaces within the cable sheath not occupied by the conductor and its insulation are filled with a neutral gas under pressure.

The thin lead sheath 21 serves the purpose of protecting the cable during shipment and installation. Prior to shipment of the cable from the factory, it should be filled with an inert gas, as carbon dioxide for example, at a pressure slightly above atmospheric, after which the ends of the sheath are sealed. The amount of gas contained in the cable should be great enough to maintain a slight positive pressure both during shipment and storage.

As my improved system depends for its successful operation on getting gas under high pressure into the strand spaces and other channels within the cable and at the same time maintain the integrity of the insulating covering on the conductor, I utilize what may be termed "feeding joints". Such a joint is illustrated in Fig. 4 in which 26 and 27 indicate parts of a connector, each part being secured to a conductor, as by soldering and the two parts united by similar means. Wrapped around one or both parts of the connector is a tube 28 of relatively small bore and made of insulating material. Instead of one tube, a plurality of such tubes may be used and arranged in parallel, the effect being the same. The tube is coiled to form a helix which gradually increases in diameter from the connector outwardly. The inner end of the tube communicates with the channel or strand spaces in the conductor and through them with the insulation on the conductor either directly or through the channels 25 in the paper insulation. The outer end of the tube is open to the supply of gas within the enclosing pipe. The turns of the tube are embedded in the hand wrapped insulation 29 surrounding the connector. Because of the relatively great length of tubing and because of the high gas pressure to which it is subjected from the chamber in the pipe line, leakage of current will not take place. The feeding joint is enclosed in a lead or other metal casting 30, the ends of which are wipe soldered to the sheaths of the connected cable lengths.

In the casing is a removable screw plug 31, Fig. 6, so that the casing may be opened to the gas supply in the pipe line or closed against it as desired. Every joint in the cable may be a feeder joint or they may be interspaced with normal joints. This will depend in part upon the lengths of cable to be serviced by each pump or other supply means.

In Fig. 6 is shown a joint for the pipe line and inside of which is a joint for the cable. To the adjacent ends of the pipe are secured heads 32. Each head has an inset 33 and the inner portion thereof is secured to a pipe section as by an electric weld 34 for example. Surrounding the heads is a tube or cylinder 35 the ends of which are secured to the heads, as by electric welds 36. The diameter of the cylinder is such that it can be slipped lengthwise over the heads to give access to the cable for the purpose of making, inspecting, and repairing the electrical joint. In the cylinder is a gas tight plug 37 which is aligned with and is larger in diameter than the plug 31 in the joint casing of the cable. By removing plug 37, plug 31 may be inserted in place in the joint casing or if there be a plug in place, it can be removed without opening any of the welded joints.

Assuming that the trenches have been properly made and the lengths of pipe united to form sections of the desired length, the next step is to carefully dry each section by passing hot air through it. After this is done, both ends of a section are closed by soft rubber diaphragms 40 which are held in place by binding bands 41. The center of the diaphragm is provided with a tube-like extension 42 which is long enough and flexible enough to act as a valve to reduce or close the central opening and which will stretch sufficiently to permit the cable to be drawn into place. During preliminary evacuating treatment this central opening is closed so that the rubber diaphragms are vacuum tight. For drawing or pulling the cable, I may use the same means that are now employed in pulling cable into ducts or such modification thereof as appears desirable. It is desirable to insert the pulling means in the pipe sections before its ends are closed by the diaphragms. Prior to pulling the cable, the air contained in the pipe section is evacuated and the pipe washed out by admitting inert gas from one or more of the charging vessels or from any suitable separate source. During subsequent operations a limited amount of gas will flow or escape through the central opening in one or both of the rubber diaphragms 35 at the ends of the pipe sections. For this purpose, the pressure of the gas may be reduced to one or two pounds positive pressure. While the gas is thus escaping, one end of the cable is inserted in the central opening in a rubber diaphragm and pulled into place from the opposite end of the pipe section. After both ends of the cable are exposed beyond the rubber diaphragms, the joints in the cable are made, the rubber diaphragms removed or cut to afford a passage way, and the tubular casings of the pipe joints moved to their final positions and welded to the flanges on the pipe section without allowing entrance of air. Under the conditions above outlined, the cable will rest on lower part of the inner wall of the pipe and the lead sheath will serve as a protection for the insulation on the conductor.

Reference has been made to leaving channels 25 within the conductor and also in the paper insulation on the conductor. To ensure that these channels are not clogged with impregnating compound, they may be blown out in the factory while the cable is warm by forcing high pressure inert gas through them from one end of the cable. As a precautionary measure, I may also adopt the same procedure after the cable is drawn into the pipe and before the lengths are connected or spliced. The ends of the pipe line will be connected to suitable terminals through which high potential current is admitted to and flows from the cable. Such terminals should of course be gas tight and capable of withstanding the high pressure to which they are subjected.

Because of the use of gas as hereinbefore described, the use of expensive stop joints to break up the hydrostatic head due to differences in elevation is avoided. By using high pressure inert gas, it becomes unnecessary to provide elaborate means to segregate one section of pipe from the other. It is desirable however to effect a reasonably good separation of one pipe section from another so that if a leak develops at one point, gas from the entire pipe system will not be discharged. Any suitable dam may be employed for this purpose. A diaphragm such as 40 illustrates one form of dam which may be used. For permanent use it may be made of metal and properly united to the cable sheath and pipe line. The most convenient place is to locate the dams at the ends of the pipe sections adjacent the heads 32.

By providing suitable channel means for establishing free communication between the inside and the outside of the sheath, it follows that the pressures on opposite side of the wall of the sheath are equalized and hence the wall does not move as the parts heat and cool and the metal is not fatigued. Because the pressures on the wall of the sheath are equalized, the sheath may be made as thin as desired with the result of a large saving in metal. Furthermore such an arrangement imposes no limitation as to the gas pressure which may be employed.

By using impregnated paper insulation, a higher dielectric value for the insulation is obtained then would be the case if gas only were used with dry paper. Because the insulation is thoroughly impregnated, there is no danger of its absorbing moisture either during the manufacture of the cable or while it is being installed. In the case of an impregnating material which does not flow at working temperature of the cable, there is no tendency for it to migrate or any tendency thereof to fill the small gas channels.

Due to the free communication between the gas channels within the cable and the gas chamber within the pipe line, there is no lag in the operation, the gas immediately responding to any change of condition within the cable and therefore preventing ionization.

Where a binding band is employed as in Fig. 8 it forms a protective covering for the insulation so that it will not be injured especially during installation.

Since in my improved system, the piping system is tight at every point and since dry inert gas is used, it follows that it satisfies, among other things, the two fundamental requirements of a cable system, namely that it shall be free of oxygen and of moisture.

What I claim as new and desire to secure by Letters Patent of the United States is:

1. A cable comprising a stranded conductor, a covering of insulation on the conductor, a sheath enclosing the insulation, channel means within the sheath, a sealed pipe line containing the cable and also forming an enclosing gas chamber therefor, said channel means establishing free communication between the inside and the outside of the sheath to equalize the gas pressure on opposite surfaces thereof, and means for supplying inert gas to the pipe chamber and to the interior of the cable and maintaining it under relatively high pressure.

2. A cable comprising a stranded conductor having spaces between strands, a covering of insulation on the conductor, a sheath enclosing the insulation, impregnating material for the insulation, channels within the insulation communicating with the strand spaces, a sealed pipe line containing the cable and forming an enclosing gas chamber therefor, means for supplying inert gas to the pipe chamber and also to said channels to equalize the pressures on opposite surfaces of the sheath, and means for maintaining the gas under relatively high pressure.

3. A cable comprising a stranded conductor having spaces between strands, insulation wrapped around the conductor in layers with channels formed between the edges of adjacent turns in the layers a sheath enclosing the insulation, impregnating material for the insulation which does not readily flow when heated to cable operating temperature, a sealed pipe line containing the cable and forming an enclosing gas chamber therefor, said chamber being in free communication with the strand spaces and channels, and means for continuously maintaining a supply of inert gas under high pressure in the chamber of the pipe line and also in the strand spaces and channels.

4. A cable comprising lengths of stranded conductor, an internal gas channel means for each length, a covering of insulation on each of the lengths, a sheath for each length, a connector for electrically connecting each two lengths, insulation for the connector and adjacent ends of the conductors, a tube of insulating material arranged in helical form adjacent the connector and embedded in the insulation thereon, said tube opening into the gas channel at its inner end and being uncovered at its outer end, a sealed pipe line having a longitudinal channel in which the cable is located, the gas channel means of the cable being in free communication with the chamber in the pipe line through said tubes to equalize the pressure on the inside and outside of the sheath, and means for supplying gas under relatively high pressure to the chamber within the pipe line.

5. A cable comprising connected lengths of stranded conductors, an internal gas channel for each length, a sheath for each length, a pipe line having a longitudinal chamber in which the cable is located with the sheath resting on the inner wall of the pipe line, a gas conveying means between the channel means and the chamber which is in free communication with both under all operating conditions, and means located at spaced intervals for feeding dry inert gas to the chamber of the pipe line and maintaining a relatively high gas pressure therein.

6. A cable comprising a stranded conductor, a covering of insulation for the conductor, a sheath enclosing the insulation, impregnating material for the insulation, said conductor containing gas conveying channels, a pipe line having a longitudinal gas chamber in which the cable is located, said chamber being in free communication with the said channels, and means for supplying an inert gas to the chamber and channels and maintaining it under predetermined pressure.

7. The method of installing cable which comprises uniting lengths of pipe to form a section, supplying heat to the section to remove moisture therefrom, closing the ends of the section, evacuating air from the section, substituting a filling of low pressure dry inert gas for the air removed from the section, pulling the cable into said section while it is filled with said gas, and finally filling the pipe section with an inert gaseous medium under relatively high pressure.

8. The method of installing cable which comprises uniting lengths of pipe to form a section, temporarily closing the ends of the section, evacuating air from the section, substituting a filling of low pressure dry inert gas for the air removed from the section while permitting a limited amount thereof to escape at one end of the section to prevent re-admission of air, pulling the cable into said section while it is filled with said gas, and finally filling the pipe section with an insulating medium under relatively high pressure.

9. The method of installing cable which comprises uniting lengths of pipe to form sections, supplying heat to the sections to remove moisture therefrom, closing the ends of the sections to prevent admission of air, evacuating air from the sections, substituting for the removed air a filling of dry inert gas under low positive pressure to prevent the re-entrance of air to the sections, pulling the cable into each section while preserving the gas pressure, joining adjacent lengths of cable while gas is flowing outwardly from the pipe sections, uniting the pipe sections and enclosing the cable joints, and finally filling the sections with a gaseous medium under relatively high pressure.

GEORGE B. SHANKLIN.